Aug. 10, 1965   W. J. HILL   3,199,311
SPHERICAL GEAR TYPE COUPLING
Filed July 5, 1963   3 Sheets-Sheet 2

INVENTOR.
William J. Hill
BY
Russell, Chittick & Pfund
Attorneys

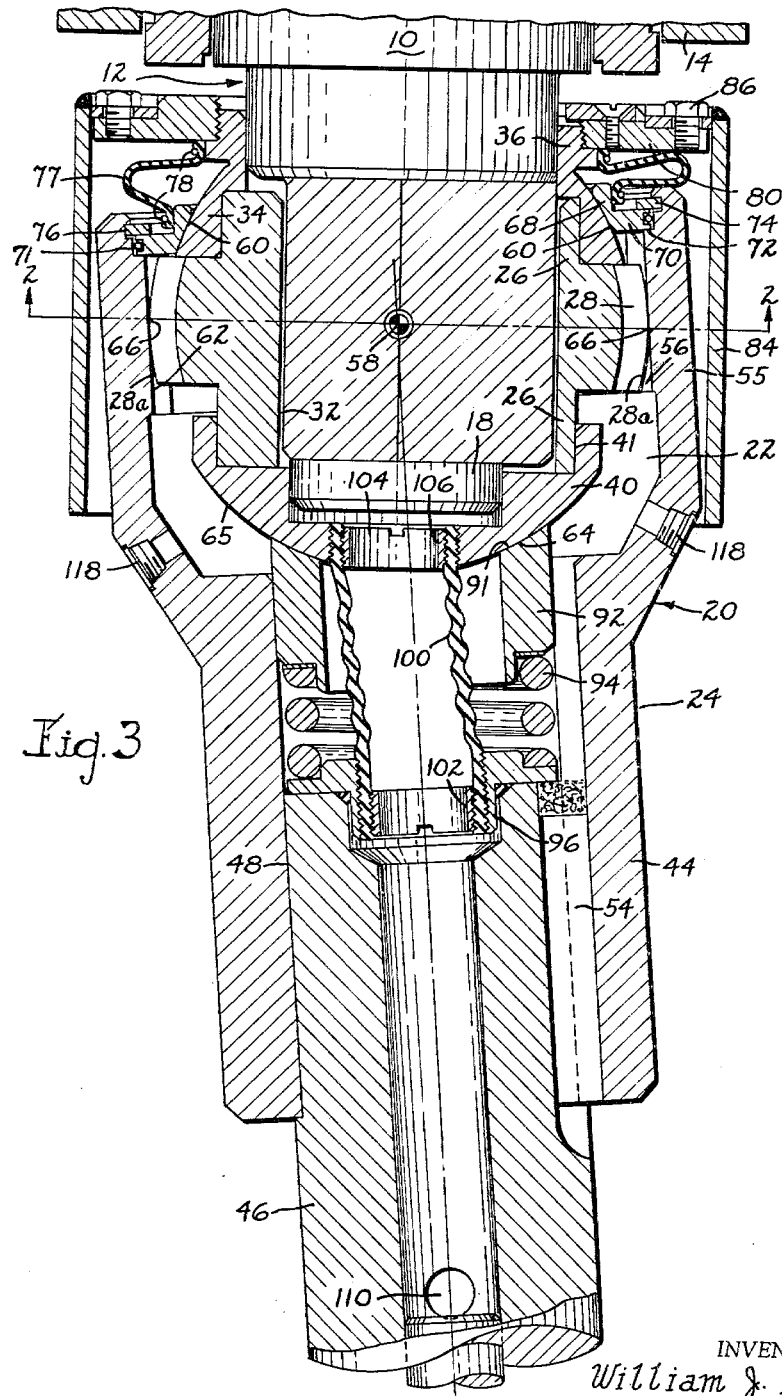

3,199,311
SPHERICAL GEAR TYPE COUPLING
William J. Hill, Holden, Mass., assignor to Morgan Construction Company, Worcester, Mass., a corporation of Massachusetts
Filed July 5, 1963, Ser. No. 292,859
8 Claims. (Cl. 64—7)

This invention relates to drive couplings and more particularly to a spherical gear type drive coupling of the type used in rolling mills at the roll end in transmitting torque from rotating drive spindles to the rolls.

Drive couplings of the above-mentioned type usually comprise the combination of a male gear member mounted on one extremity of a drive spindle and pivotally meshed within a female gear member. The female gear member is in turn mounted on the end of a roll capable of being adjusted to various center positions. The other extremity of the drive spindle is connected by a gear type torque transmitting joint to a pinion rotating on a fixed center. Thus it can be seen that although spindle misalignment will occur as the rolls are adjusted to various center positions, the pivotal connections at both ends of the intermediate spindle will provide a continuous driving relationship between the rotating pinion and the roll end.

Further describing the conventional drive coupling construction, the male member is usually comprised of a spherically formed gear axially mounted on the extremity of the drive spindle. The female member commonly referred to as the "coupling box" is in turn comprised of an elongated sleeve provided at one extremity with a drive socket lined with hardened inserts called "driving flats" and at the opposite extremity with a straight toothed internal gear designed to axially accept the male gear in pivotal meshing engagement. The distance between the center of the drive socket and the operating center of the internal gear is commonly referred to as "overhang."

The drive socket is designed to permit quick, efficient alignment and axial acceptance of the roll end during roll changes, the driving flats then cooperating with oppositely disposed drive surfaces on the roll end to effect a positive driving engagement therebetween. In this manner, rotation of the torque transmitting assembly comprising the pinion, drive spindle and drive coupling will result in a corresponding rotation of the roll.

Although satisfactory in many respects, experience has shown that use of the above described drive coupling results in the creation of mill stand vibrations during the rolling operation. As wear of the drive coupling components and the roll end progresses, these vibrations become more pronounced with resulting adverse effects in the quality of the product being rolled. Moreover, the vibrations tend to accelerate wear in all parts of the torque transmitting assembly with particular emphasis on the mating gears and the hardened driving flats.

A careful analysis of the above-described drive coupling construction has shown that the mill stand vibrations are caused by a combination of several factors including:

(A) The necessity to maintain adequate clearance between the roll end and the drive socket in order to facilitate rapid roll changes.

(B) Loosening under mill vibrations of the driving flats, and (C) The effects of centrifugal force.

As mentioned above, adequate clearances between the driving surfaces of the roll end and coupling box drive socket must be maintained in order to permit quick and efficient mounting of the coupling box on the roll end during roll changes. However, as this clearance is gradually increased by progressive wear, it becomes impossible in conventional drive couplings to hold the coupling box in co-axial alignment with the roll end, resulting in turn in the development of a flexure point and an eccentric relationship therebetween.

Thus it can be seen that the above-described torque transmitting assembly will gradually develop three points of flexure or eccentricity: a first point at the roll end caused by a progressively increasing clearance between the driving surfaces of the roll end and drive socket; an intermediate point at the gear pivoting center of the drive coupling; and a third point at the torque transmitting joint between the drive spindle and the pinion.

It should be noted that both the roll end and pinion are rotatably supported within bearings. In contrast however, the drive coupling gear pivoting center is spaced in an unsupported manner from the roll end by the overhang distance and from the pinion by the length of the spindle. Consequently, as rotation of the torque transmitting assembly takes place during operation of the mill, centrifugal force acts at the intermediate flexure point corresponding to the drive coupling gear pivoting center, tending to force the coupling box out of axial alignment with respect to the rotational axis of the roll. This in turn causes the coupling box to assume a fixed angular relationship with respect to the roll axis, thereby causing the center of mass of the drive coupling to describe an orbital path around the projected axis of the roll. Eccentric rotation of the drive coupling mass and spindle extremity at this point is the primary cause of the above-mentioned roll stand vibrations.

It has now been discovered that these vibrations can be markedly reduced and in some cases entirely prevented by reducing the number of flexure points in the torque transmitting assembly from three to two. This is accomplished by the elimination of overhang and the positioning of the drive coupling gear pivoting center directly on the roll end. By so doing, the rotational axis of an angularly disposed spindle will intersect the axis of rotation of the roll at a point within the roll end.

It is accordingly an object of the present invention to provide a drive coupling capable of geometrically eliminating the effect of centrifugal force and accompanying mill stand vibrations during rotation thereof by placing the axis of rotation of an angularly disposed drive spindle in intersection with the axis of rotation of the roll at a point along the roll axis within the extremity of the roll end.

Another object of the present invention is to provide a means of providing the roll and male gear member with a common axis of rotation while simultaneously eliminating overhang.

A further object of the present invention is to provide a spherical gear type drive coupling suitable and capable of transmitting torque from the drive spindles to the rolls in a rolling mill without the creation of pronounced vibrations.

A still further object of the present invention is to provide a gear type drive coupling for use in rolling mills of considerably lighter weight than drive couplings heretofore utilized.

Another object of the present invention is to reduce the angle of spindle misalignment for a given roll adjustment by increasing the distance between the drive coupling gear pivoting center and the pinions.

A further object of the present invention is to provide a means of readily aligning the drive socket with the roll end during roll changes.

Another object of the present invention is to eliminate separate driving flats in the drive socket.

These and other objects of the present invention will become more apparent as the description proceeds with the aid of the accompanying drawings in which:

FIG. 3 is a sectional view similar to FIG. 1 illustrating the internal pivotal action of the drive coupling components as the spindle is angularly disposed with respect to the roll axis.

Figure 1:
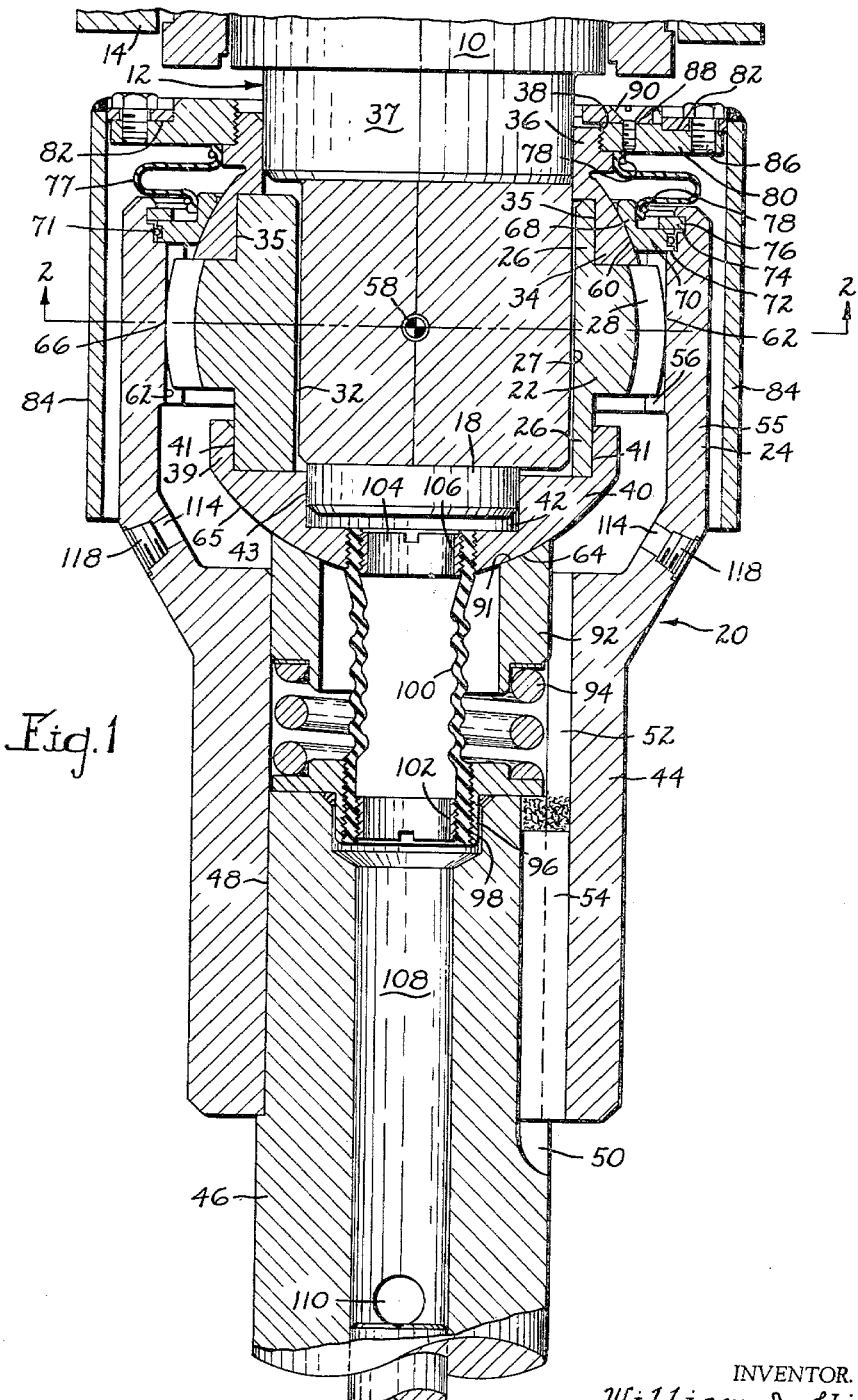
FIG. 1 is a sectional view in elevation taken along line 1—1 of FIG. 2 showing the coupling box connecting the drive spindle to the roll end as employed in a vertical mill installation.

Referring now to FIG. 1, a roll 10 having a downwardly disposed roll end generally indicated at 12 is shown rotatably mounted within a roll bearing 14. The roll end 12, commonly referred to as the "wobbler" end, is provided with an intermediate square section having four flat driving faces 16 and a cylindrical projection 18 smaller in diameter than the cross-sectional dimensions of the intermediate square section. It will be understood that although a square driving section has been shown and described, any other desired cross sectional configuration may be adopted.

The spherical gear type drive coupling herein chosen for purposes of disclosure and generally indicated at 20 will now be described with emphasis being placed first on the male member 22 and secondly on the female member 24. However, although described in this manner it should be noted that the male and female members are completely assembled as a single integral unit prior to their installation in the mill. It should also be noted that although described in connection with a vertical mill, the drive coupling may also be utilized in a horizontal mill.

The male member generally indicated at 22 is comprised basically of a relatively short tubular body 26 having a circumferentially disposed spherical gear 28 integrally machined thereon. Tubular body 26 is additionally provided with a driving socket 27 in the form of a parallel sided square passageway concentric with the spherical gear. The passageway dimensions are slightly greater than the corresponding cross-sectional dimensions of the roll wobbler's square driving section 16. In this manner, adequate clearance 32 is provided between the oppositely disposed flat surfaces of the wobbler 12 and the driving socket 27, a feature of particular importance when workmen are attempting to align and insert the roll end 12 within the driving socket 27 during roll changes.

Tubular body 26 is further provided at its upper end with an upper spherical pilot ring 34 press fitted thereto as at 35 and terminating at its upper end in an annular collar 36 externally threaded as at 38. Collar 36 is internally provided with an axial passageway having an axis of rotation common with the axis of rotation of male member 22. The diameter of this axial passageway is slightly larger than the corresponding outer diameter of the cooperating portion 37 of the roll end. The collar 36 and portion 37 provide a first means of axial alignment between the roll and body 26. A lower spherical pilot cup 40 with a cylindrical wall 39 is also press fitted to tubular body 26 as at 41. A circular recess 42 having a diameter only slightly larger than the outer diameter of cylindrical extension 18 is provided within cup 40 in order to provide a second means of insuring axial alignment between male member 22 and roll end 12. Thus it can be seen that when the roll end 12 is partially inserted within the socket 27 in male member 22, the square cross section of the wobbler having flat driving surfaces 16 can be aligned with the oppositely disposed flat driving surfaces of the male driving socket 27 by rotating the roll either clockwise or counterclockwise through a maximum angular displacement of only 45°. The clearance 32 provided between the oppositely disposed flat driving surfaces of the wobbler and male driving socket 27 facilitates the axial insertion of the former within the latter following proper alignment. When the roll end has been fully inserted within the male member 22, the axially spaced cylindrical portions 37 and 18 cooperate with collars 36 and 43 respectively to insure that the axis of rotation of the roll 10 is aligned with the axis of rotation of the male member 22. In this manner, rotation of male member 22 will result in rotation of the roll 10 with both components rotating concentrically about a common axis.

It should also be mentioned at this time that in contrast to the conventional structure, the male member 22 is positioned directly on the roll end 16 rather than, as in prior constructions, on the spindle extremity. The circumferentially disposed spherically cut teeth of gear 28 are located radially from the flat driving surfaces 16.

Thus in this manner, the male gear 28 is located within a transverse space which also includes the roll end, thereby completely eliminating the overhang of the prior type coupling box. The advantage of this feature will be more fully described in connection with the description of female member 24 comprising the second principal drive coupling component. Female member 24 commonly referred to as the "coupling box" is comprised basically of a tubular casing 44 having its lower portion press fitted on the upper end 48 of a tubular drive spindle 46. Both spindle 46 and female member 24 are provided with longitudinal oppositely disposed keyways 50 and 52 within which a key 54 is inserted. If deemed necessary additional keys and keyways may be provided to insure a positive driving relationship between spindle 46 and female member 24.

Female member 24 is formed at its upper end with an enlarged diameter 55 containing a straight toothed internal ring gear 56 cut with the same number of teeth and dimensions as outwardly disposed spherical gear 28. By this construction, the toothed male member 22 may be placed in cooperating engagement with the teeth of female member 24 in a manner that provides driving and turning engagement therebetween as illustrated in FIGS. 1 and 3. The positive engagement is provided by the meshing of the male spherical gear teeth 28 within the inwardly disposed female ring gear 56. In addition, as can be seen in FIG. 3 angular misalignment of spindle 46 with respect to roll 10 may occur without interruption of the driving relationship therebetween by the pivotal action of the spherical gear 28 within ring gear 56. It should also be noted at this time (see FIG. 3) that when the axis of rotation of spindle 46 is angularly misaligned with respect to the axis of rotation of roll 10, their point of intersection coincides with the drive coupling gear pivoting center indicated at 58.

The means of insuring the central positioning of male member 22 within female member 24 during operation of the mill will now be described. As can be readily seen from the drawings, the aforementioned central positioning is of importance in preventing eccentric rotation of drive coupling gear pivoting center 58 caused by centrifugal force as spindle 46 is rotated. For this reason, dominating pilot surface 62 and supporting pilot surfaces 60 and 64 are provided between the male and female members 22 and 24.

Figure 2:
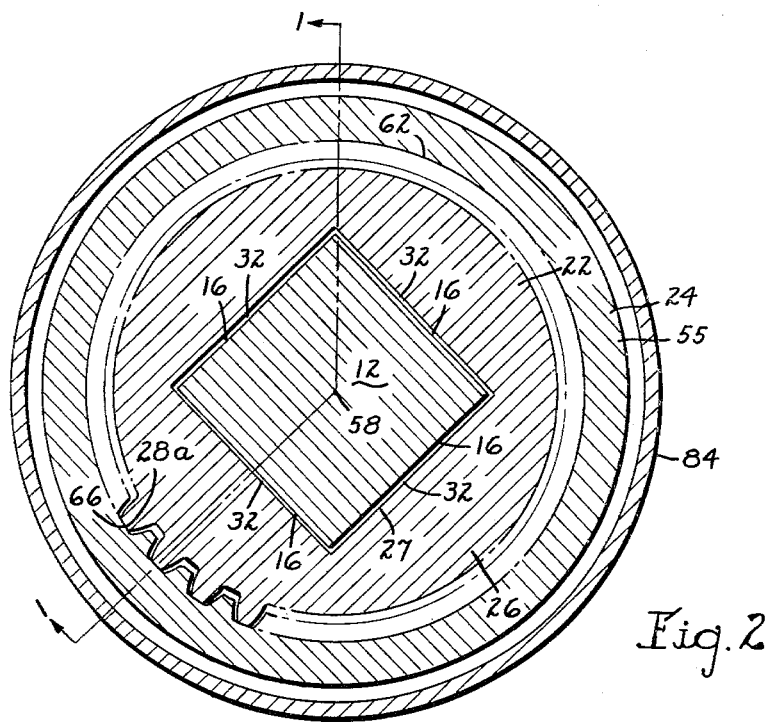
FIG. 2 is a horizontal sectional view taken along line 2—2 of FIG. 1.

As can be seen in FIGS. 1 and 2, a dominating pilot surface 62 is provided by placing the end extremities 28a of male spherical gear teeth 28 in abutting relationship with the root circle of the female ring gear 56 as indicated typically at 66 in FIGS. 1, 2 and 3. Since the outwardly disposed surfaces of teeth 28 are spherical with a radius extending from a point corresponding to the drive coupling gear pivoting center 58, pilot surface engagement will be effectively maintained regardless of angular spindle misalignment as shown in FIG. 3.

An upper support surface 60 is provided between upper spherical pilot 34 and upper spherical seat 68. Seat 68 has an annular part 70 which is held in place on an inwardly disposed lip 72 near the upper end of enlarged port 55 of female member 24 by an expansible retaining ring 74 in turn seated within groove 76. Part 70 may shift radially slightly on lip 72. An O-ring 71 seals the space therearound. A flexible annular seal 77 positioned intermediate spherical seat 68 and upper spherical pilot collar 36 and held thereon by snap rings 78 prevents entrance of foreign material into the coupling box.

A flat collar 80 is then screwed on the threaded portion 38 of upper collar 36. Collar 80 has an upwardly facing annular ledge 82 on which the upper end of shroud 84 is seated and held in place by a plurality of bolts threaded into the collar 80 and indicated typically at 86. Thus it can be seen that the shroud 84 and seal 77 cooperate in excluding foreign matter, such as water and mill scale, from contaminating the inner coupling box components.

A third lower support surface 64 is provided between the downwardly disposed spherical face 65 of lower spherical pilot cup 40 and the upwardly disposed annular spherical face 91 of lower tubular spherical seat 92. Seat 92 receives an upward force and is held against the lower spherical pilot face 65 by compressed helical spring 94. An annular spring retainer 96 is positioned between spring 94 and the upper extremity of tubular spindle 46. The retainer is provided with an axial threaded passageway 98 within which flexible hose coupling 100 is threaded and held by a threaded hose retaining ring 102. The upper extremity of hose coupling 100 is in turn threaded within axially disposed passageway 104 in lower spherical pilot 40 and held in place by a second threaded hose retaining ring 106.

When so positioned, spring 94 acts both as a shock absorber in order to absorb shocks expreienced by the coupling box when being seated on the roll end and as a means of compensating for manufacturing tolerances in order to provide a tight but slidable relationship between the male and female members at the upper and lower spherical pilot engaging areas 60 and 64. Hose coupling 100 provides a means of draining cooling water and any foreign matter that may succeed in passing between portion 37 of the roll neck and collar 36. In this manner, any water and foreign matter reaching the unoccupied portion of recess 42 will be immediately drained downwardly through the tubular hose coupling 100 to passageway 108 in spindle 46, from whence it can flow outwardly through horizontally disposed drainage passageway 110.

As previously mentioned the coupling box is first assembled as an integral unit prior to its positioning in the mill as a drive connection between the roll end and the drive spindle.

Ports 114 are provided at the tapered portion of female member 24 to provide means for filling the coupling box with lubricating oil following its assembly. Once the coupling box has been filled to a sufficient level with lubricating oil, plug 118 is screwed into port 114 to prevent subsequent escape of oil during operation.

Having thus described the construction of the coupling box, its operational advantages will now be reviewed.

Figure 4:
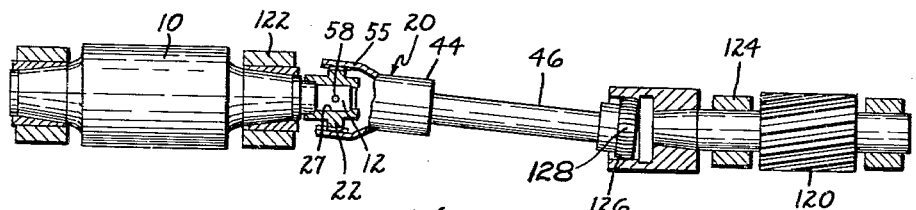
FIG. 4 is a schematic showing of the complete coupling assembly in operative position between the driving pinion and the roll.

As can be seen in FIG. 4, the roll 10 and pinion 120 are supported for rotation within bearings 122 and 124. The spindle 46 is connected to pinion 120 by a spherical type torque transmitting joint 126 and to the roll end by the drive coupling 20. A feature of primary importance is the positioning of the drive coupling's gear set operating center 58 at a point directly on the roll end 12. This insures that the axis of rotation of the spindle 46 and the axis of the roll 10 during angular spindle misalignment will intersect at a point within rather than beyond the end of the roll. In this way, overhang is eliminated and any play that may eventually develop between the roll end and socket 27 within male member 22 will not be unduly magnified.

It will also be seen from the foregoing explanation that the construction of the present invention results in an increase in distance between the points of intersection 58 and 128 (see FIG. 4) of the spindle axis with the roll and pinion axis. This reduces the angular divergence of the spindle as compared with the prior art. Conversely, the roll and pinion may be moved closer together without increasing the angular divergence of the spindle over the prior art structures.

The two axially spaced short cylindrical sections 37 and 18 (see FIGS. 1 and 3) cooperate with collars 36 and 43 respectively to cause the axis of rotation of the male member 22 to coincide with the axis of rotation of the roll. In this manner, some clearance can be provided between the oppositely disposed flat driving surfaces of the roll end and the male end driving socket 27 without loss of concentricity between the roll and male end.

In addition, triple pilot or support surfaces 60, 62 and 64 are provided in order to centrally position the gear set operating center 58 within the female member at the point of intersection of the axis of rotation of the spindle and the axis of rotation of the roll, regardless of angular spindle misalignment. In this manner, only one axial eccentric relationship is created and mill vibrations caused by the eccentric rotation of the heretofore overhanging gear set are eliminated.

It is intended to cover all changes and modifications of the invention chosen for purposes of disclosure which do not constitute departures from the spirit and scope of the invention.

I claim:

1. A spherical gear type roll end drive coupling of the type used in transmitting torque from a drive spindle to the roll wobbler of a roll in a rolling mill comprising the combination of: a male member provided with a circumferentially disposed spherical gear, said male member further provided with a drive socket suitably dimensioned to permit slidable insertion therein of said wobbler, the end of said wobbler extending into said socket to a point beyond the center-line of said spherical gear, the outer surfaces of said inserted wobbler being mechanically engaged by the inner surfaces of said socket during subsequent rotation thereof; a female member internally provided at one end with an inwardly disposed ring gear, the other end of said female member mounted on said drive spindle with the axis of rotation of said spindle in alignment with the axis of rotation of said female member and said ring gear, said male member axially inserted in positive pivotal engagement within said female member with the teeth of said spherical gear meshing with the teeth of said ring gear to form a gear set, the axis of rotation of said spindle intersecting the axis of rotation of said roll at a point along the roll axis well within the end of said wobbler, pilot means for maintaining the operating center of said gear set at the point of intersection of the axes of rotation of said roll and spindle, whereby rotation of said drive spindle will result in rotation of said male and female members and said roll; means for retaining said male member in positive pivotal engagement within said female member and for providing a watertight seal therebetween; and drainage means axially positioned within said female member for continuously removing water and foreign matter deposited therein during operation of the mill.

2. A spherical gear type drive coupling for use in a rolling mill in providing a drive connection between a roll wobble and a drive spindle, said drive coupling comprising: a female member mounted on one end of said spindle with an axial passageway extending therethrough containing an inwardly disposed ring gear, the rotational axis of said ring gear in alignment with the rotational axis of said female member and said drive spindle; a male member slidably mounted on the roll wobbler, said male member comprising a spherical gear having an axially disposed drive socket with cross-sectional dimensions slightly larger than the corresponding cross-sectional dimensions of said wobbler; pilot means associated with said male member for maintaing its axis of rotation in alignment with the rotational axis of said roll; said male member axially inserted within said female member with said spherical gear meshing in positive pivotal engagement within said ring gear, thereby permitting the rotational axis of said spindle to pivot about a point on the roll axis well within the end of said wobbler.

3. For use in a rolling mill in providing a drive connection between a roll wobbler and a drive spindle, a gear type drive coupling comprising the combination of: a male gear member slidably mounted on said wobbler for rotation therewith, said male member provided with a circumferentially disposed spherical gear, the operating center of said spherical gear coinciding approximately with the center of said wobbler when said male gear member is axially mounted thereon, said male gear member further provided with a first pilot means for maintaining its axis of rotation in alignment with the rotational axis of said roll; a female gear member axially mounted on the end of said drive spindle for rotation therewith, said female member internally provided with an inwardly disposed ring gear, the rotational axis of said spindle aligned with the axis of rotation of said female member and said ring gear; said male gear member axially inserted within said female gear member with said spherical gear meshing in positive pivotal engagement with said ring gear to provide a cooperating rotatable gear set; a second pilot means positioned intermediate said male and female members for aiding in maintaining the pivotal center of said gear set in coincidental relationship with the axis of rotation of said roll at a central point on said wobbler; and sealing and retaining means for preventing the contamination of said gear set by cooling water and foreign matter and for retaining said male and female members in positive pivotal engagement.

4. Means for connecting a drive spindle to a driven roll in which the axis of the drive spindle is at an angle to the axis of the roll, said means comprising a roll neck on said roll having an extension therebeyond, a spherical gear mounted on said extension, means for preventing relative rotation of said extension and spherical gear, the axis of said extension and said spherical gear coinciding, means on both sides of said extension for cooperating with means on both sides of said spherical gear for maintaining the concentricity of said spherical gear wth the axis of said extension, an internal ring gear positioned about and meshing with said spherical gear, said ring gear connected with said drive spindle in a position in which the axis of said ring gear is aligned with the axis of said drive spindle, said drive spindle swingable within limits to shift said ring gear with respect to said spherical gear, the construction being such that the extended axis of said drive spindle when at an angle to said roll axis will always intersect the roll axis at the same point, which point lies in any transverse plane passing through the teeth of said spherical gear at any position of maximum diameter of said spherical gear teeth.

5. Coupling means for connecting a driving pinion to a roll in a rolling mill in which the axis of the pinion and the axis of the roll are substantially parallel but not in alignment, said means comprising a driving spindle connectable at one end to said pinion in conventional manner with the axis of said driving spindle intersecting the axis of said pinion, means at the other end of said driving spindle whereby the driving spindle may be removably connected to the end of said roll by movement in a direction axially of said roll, said means comprising a cylindrical tubular extension, a ring gear about the interior of said extension, a spherical gear mounted in meshing relation with said ring gear, said spherical gear having a socket therethrough, the configuration of said socket being such that it may receive therein an extension on the end of the said roll of similar configuration, the axis of said spherical gear coinciding with the axis of said extension and roll, said spherical gear having means fixed with respect to said ring gear for maintaining said spherical gear in axial position relative to said ring gear while permitting swinging within limits of the drive spindle with respect to the axes of said spherical gear and said roll whereby said drive spindle may transmit power from the said pinion to the said roll, two concentric cylindrical collars of unequal diameter on either side of said spherical gear and fixed with respect thereto, the smaller of said collars adapted to receive in close fitting engagement a cylindrical portion on the end of the roll shaft and the larger of said collars being adapted to receive in close fitting engagement a larger cylindrical portion positioned between said cooperating extension and the said roll, said collars and cooperating cylindrical portions on the roll providing means for maintaining the said spherical gear in axial alignment with the said roll.

6. Means for connecting a roll in a rolling mill to a driving pinion, said means comprising a multi-sided extension on the end of and coaxial with said roll, a spherical gear having a corresponding multi-sided interior socket mounted on said extension with the axis of the roll and the axis of the spherical gear coinciding, an internal ring gear mounted on said spherical gear, means connecting said internal ring gear to a drive spindle, with the axis of the drive spindle being in alignment with the axis of the said internal ring gear, means for preventing axial movement of said spherical gear with respect to said ring gear while permitting swinging of the drive spindle axis with respect to the roll axis, the axis of said drive spindle always intersecting the axis of said roll at the point where any plane passing through the teeth of said spherical gear at a section of maximum diameter intersects the roll axis, and means on said roll end on both sides of said multi-sided extension for cooperating with corresponding parts on both sides of said spherical gear for maintaining said spherical gear in a position in which its axis coincides with that of said roll and extension.

7. For use in a rolling mill in providing a drive connection between a roll wobbler and a drive spindle, a gear type coupling comprising the combination of: a male spherical gear member having a drive socket extending axially therethrough, said socket suitably dimensioned to receive said roll wobbler in axial insertion therein; support means for maintaining the axis of rotation of said roll in alignment with the rotational axis of said male spherical gear member; a female gear member connected to said drive spindle for rotation therewith, said male spherical gear member pivotally meshed within said female gear member in such position that the rotational axis of said spindle intersects the rotational axis of said roll at a point on the roll axis well within the end of said wobbler during angular misalignment of said spindle relative to said roll, whereby rotation of said spindle will result in a corresponding rotation of said roll.

8. For use in a rolling mill in providing a drive connection between a roll wobbler and a drive spindle, a gear type coupling comprising the combination of: a male spherical gear member having a drive socket extending axially therethrough, said socket suitably dimensioned to receive said roll wobbler in axial insertion therein; support means for maintaining the axis of rotation of said roll in alignment with the rotational axis of said male spherical gear member; a female gear member connected at one end to said drive spindle, the other end of said female gear member having an axial passageway extending therethrough containing an inwardly disposed ring gear, said ring gear adapted to mesh in positive pivotal engagement with said male spherical gear member in such position that the rotational axis of said spindle intersects the rotational axis of said roll at a point on the roll axis well within the end of said wobbler during angular misalignment of the spindle relative to said roll, whereby rotation of said spindle will result in a corresponding rotation of said roll.

References Cited by the Examiner

UNITED STATES PATENTS

| | | | |
|---|---|---|---|
| 1,426,009 | 8/22 | Rantsch | 64—9 |
| 2,496,702 | 2/50 | Dykeman et al. | 64—9 |
| 2,598,780 | 6/52 | Garnier | 64—23 |
| 2,618,941 | 11/52 | Iversen | 64—7 |
| 2,842,945 | 7/58 | Swanson | 64—9 |
| 2,893,222 | 11/59 | Albedyhl et al. | 64—9 |

ROBERT C. RIORDON, *Primary Examiner.*